(12) United States Patent
Haller et al.

(10) Patent No.: US 8,424,563 B2
(45) Date of Patent: Apr. 23, 2013

(54) COMPACT VALVE POSITION INDICATOR

(75) Inventors: John J. Haller, Boonton, NJ (US); Gregory J. Volz, Pequannock, NJ (US); Emma C. Tejada, East Brunswick, NJ (US); Roy B. Bogert, Lincoln Park, NJ (US); Emmanuel D. Arceo, Bloomfield, NJ (US); Edgar Marino, North Plainfield, NJ (US)

(73) Assignee: Automatic Switch Company, Florham Park, NJ (US)

( * ) Notice: Subject to any disclaimer, the term of this patent is extended or adjusted under 35 U.S.C. 154(b) by 371 days.

(21) Appl. No.: 12/782,062

(22) Filed: May 18, 2010

(65) Prior Publication Data

US 2010/0294373 A1  Nov. 25, 2010

Related U.S. Application Data

(60) Provisional application No. 61/179,434, filed on May 19, 2009.

(51) Int. Cl.
*E03B 7/07* (2006.01)

(52) U.S. Cl.
USPC ............. 137/554; 340/686.1; 340/815.65; 340/815.66; 340/815.73; 116/277

(58) Field of Classification Search ............ 137/554; 340/686.1, 815.65, 815.66, 815.73; 116/277
See application file for complete search history.

(56) References Cited

U.S. PATENT DOCUMENTS

| | | | | |
|---|---|---|---|---|
| 4,060,050 A | * | 11/1977 | Simonsson | 116/268 |
| 4,596,980 A | * | 6/1986 | Bergeron et al. | 340/626 |
| 5,469,805 A | * | 11/1995 | Gibbs | 116/284 |
| 5,471,138 A | * | 11/1995 | Glass et al. | 324/207.19 |
| 5,623,963 A | * | 4/1997 | Stommes et al. | 137/554 |
| 5,647,396 A | * | 7/1997 | Stommes et al. | 137/554 |
| 5,676,456 A | * | 10/1997 | Sharp | 362/318 |
| 5,829,093 A | * | 11/1998 | Kim | 15/339 |
| 6,021,652 A | * | 2/2000 | Walker | 68/207 |

(Continued)

FOREIGN PATENT DOCUMENTS

| | | |
|---|---|---|
| DE | 10 2006 049 651 | 4/2008 |
| WO | 9745599 | 12/1997 |
| WO | 2005098299 | 10/2005 |

OTHER PUBLICATIONS

N. Lindner, International Preliminary Report on Patentability for International Patent Application No. PCT/US2010/035215, The International Bureau of WIPO, dated Dec. 1, 2011.

(Continued)

*Primary Examiner* — John Rivell
*Assistant Examiner* — Minh Le
(74) *Attorney, Agent, or Firm* — Locke Lord LLP

(57) ABSTRACT

A system for indicating the status of a valve may include an encapsulation with electronic circuitry disposed at least partially therein, a communication sub-system, a sensor, an indicator and a power source. The encapsulation may be zero volume, and the indicator may include a color changing skin. A method of indicating the status of a valve may include providing a valve, providing a status indicating system, changing a status of the valve, sensing a status of the valve, and indicating a status of the valve. A method of encapsulating a status indicating system may include providing an encapsulant and coupling at least a portion of the system with the encapsulant.

17 Claims, 1 Drawing Sheet

U.S. PATENT DOCUMENTS

| | | | |
|---|---|---|---|
| 6,189,565 B1 * | 2/2001 | Skog | 137/554 |
| 6,242,909 B1 | 6/2001 | Dorsey et al. | |
| 6,374,814 B1 * | 4/2002 | Cook et al. | 123/568.21 |
| 6,460,567 B1 * | 10/2002 | Hansen et al. | 137/554 |
| 6,742,541 B2 | 6/2004 | Pimouguet | |
| 7,135,960 B2 * | 11/2006 | Arcaria et al. | 340/384.1 |
| 7,156,121 B2 * | 1/2007 | Cox et al. | 137/554 |
| 7,284,570 B1 * | 10/2007 | Gracik et al. | 137/554 |
| 7,784,490 B1 * | 8/2010 | Stewart et al. | 137/556 |
| 7,891,311 B2 * | 2/2011 | Logan et al. | 116/273 |
| 8,122,905 B2 * | 2/2012 | Pape et al. | 137/554 |
| 2002/0007854 A1 * | 1/2002 | Dilger et al. | 137/554 |
| 2002/0044064 A1 * | 4/2002 | Mogi | 340/686.1 |
| 2006/0145882 A1 * | 7/2006 | Murayama | 340/686.1 |
| 2008/0078462 A1 | 4/2008 | Minervini et al. | |
| 2008/0121290 A1 * | 5/2008 | Pape et al. | 137/551 |
| 2008/0156121 A1 * | 7/2008 | Radomsky et al. | 73/865.8 |
| 2009/0107566 A1 * | 4/2009 | Gehrke et al. | 137/554 |
| 2010/0116365 A1 * | 5/2010 | McCarty | 137/554 |

OTHER PUBLICATIONS

Antonio Ceuca, International Search Report for International Patent Application No. PCT/US2010/035215, European Patent Office, dated Sep. 2, 2010.

Antonio Ceuca, Written Opinion for International Patent Application No. PCT/US2010/035215, European Patent Office, dated Sep. 2, 2010.

* cited by examiner

COMPACT VALVE POSITION INDICATOR

CROSS REFERENCE TO RELATED APPLICATIONS

This application claims the benefit of U.S. Provisional Application No. 61/179,434 filed on May 19, 2009.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The invention disclosed and taught herein relates generally to valves; and more specifically relates to indicating the position of linear- and rotary-motion control valves.

2. Description of the Related Art

Various types of linear- and rotary-motion type valves are known in the art. There is often a need to know or monitor one or more statuses of a valve during use, such as whether or to what extent the valve is open or closed. The indicator devices presently available typically provide one of two forms of indication of the position of a control valve: electrical or visual mechanical. The visual mechanical indicators include various forms of mechanically driven indicating devices that can translate mechanical motion of the shaft of the control valve, whether it is linear or rotary, to a change in color to indicate whether the control valve is in the open or closed position. In conjunction with this mechanical visual indication can be an electrical means that provides a corresponding electrical signal for the open and closed positions of the control valve. The indicators of the present state of the art can be bulky or costly to produce. Examples of present indicators include U.S. Pat. No. 6,242,909 to Dorsey et al., and No. 6,742,541 to Pimouguet, each of which is assigned to the assignee of the present invention and incorporated herein by reference for all purposes. Other examples include U.S. patent application Pub. No. 2008/0078462 to Minervini et al., which is incorporated herein by reference for all purposes.

The examples mentioned above share common design traits in that they include electrical enclosures that house the switching means and are coupled to a mechanical visual indicator. The construction of devices such as these can become cumbersome and expensive based on a number of factors or operating conditions, such as temperature, humidity, water ingress protection or restrictions based on hazardous conditions or locations. Large aluminum or stainless steel die castings, precision machining of surfaces and extensive gasketing of the valve indicator enclosures may often be required to meet the demands of a particular application, which may nonetheless include undesired spaces within the enclosures into which water, air, or other unwanted substances may enter. While each of the mentioned examples may have certain limited applications, there is a need to improve the construction of valve indicators.

The invention disclosed and taught herein is directed to an improved system for valve status indicating and to methods of making and using the same.

BRIEF SUMMARY OF THE INVENTION

A system for indicating the status of a valve may include an enclosure, such as an encapsulation, for protecting electronic circuitry or other components disposed therein, and a system, such as a sub-system, for communicating between the inside and outside of the enclosure. The encapsulation may, but need not, be zero volume. The communication sub-system may, but need not, include a wireless integration protocol, among other components. The system may further include one or more sensors, indicators, or power sources. A valve may include one or more of the systems and methods described herein, in whole or in part. A method of indicating the status of a valve may include providing a valve, providing one or more of the systems described herein, in whole or in part, changing the status of the valve, sensing the status of the valve and indicating the status of the valve, such as to a user. A method of encapsulating or enclosing at least a portion of a valve status indicating system of the present invention may include providing one or more of the systems described herein, in whole or in part, providing an encapsulant, providing an interconnect system and coupling at least a portion of one or more systems with the encapsulant.

DETAILED DESCRIPTION

Figure 1:
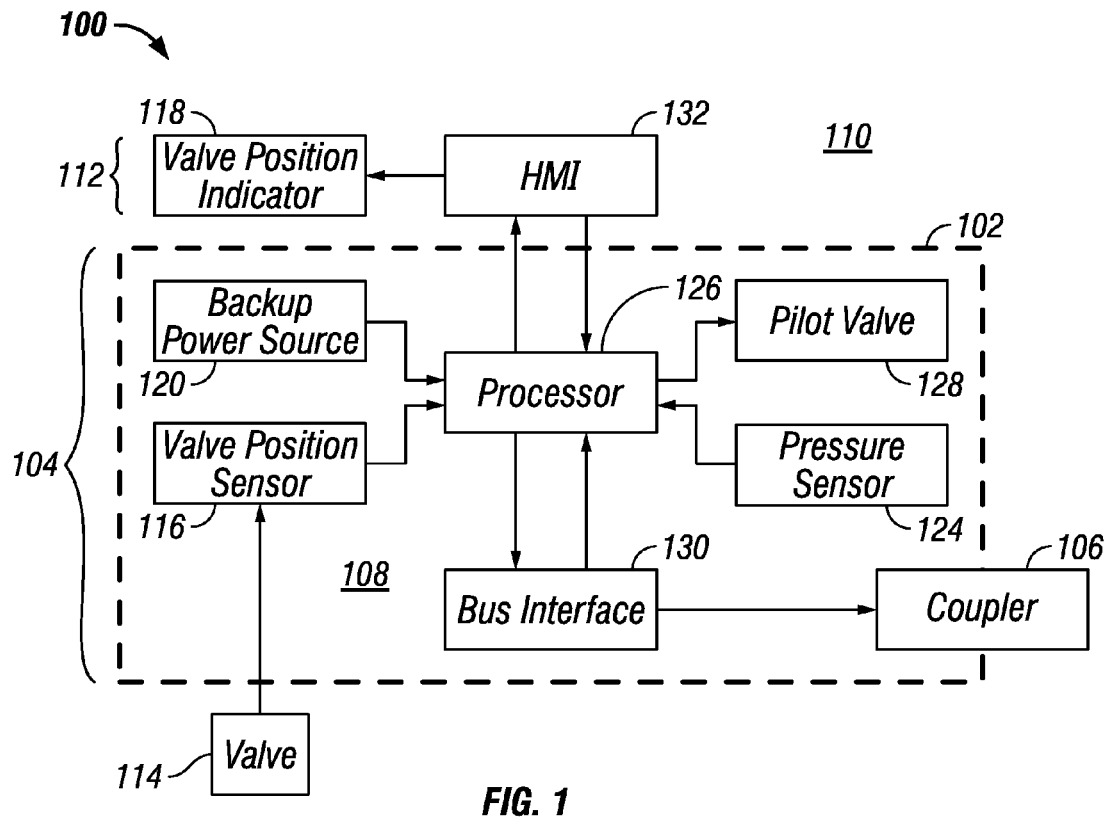
FIG. 1 is a block diagram that illustrates one of many embodiments of a valve status indicating system utilizing certain aspects of the present invention.

The Figures described above and the written description of specific structures and functions below are not presented to limit the scope of what Applicants have invented or the scope of the appended claims. Rather, the Figures and written description are provided to teach any person skilled in the art to make and use the invention for which patent protection is sought. Those skilled in the art will appreciate that not all features of a commercial embodiment of the invention are described or shown for the sake of clarity and understanding. Persons of skill in this art will also appreciate that the development of an actual commercial embodiment incorporating aspects of the present invention will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the invention disclosed and taught herein is susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved. Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

As will be understood by one of ordinary skill in the art having the benefits of this disclosure, the systems and methods described herein may have many different applications, and are described with respect to, for example, valve position indicating for illustrative purposes. For example, the present invention may indicate one or more statuses of a valve, separately or in combination, such as a position, condition, function, or other status of the valve, but need not, and may alternatively indicate the status(es) of a different device or system, as required by a particular application.

Applicants have created a compact and cost effective system and method for indicating the status of a valve. The system may include an enclosure or encapsulation for housing one or more components, such as electronic circuitry, and one or more couplers or terminations suitable for an environment surrounding the system, which may, but need not, be hazardous to one or more components housed in the encapsulation. The encapsulation may be sealed to the environment, for example, by an encapsulating compound, or encapsulant, and may, but need not, have zero volume when evaluated for hazardous locations. A method of encapsulation of electronic circuitry may include providing environmental protection for one or more of the system components, such as a printed circuit board or electrical components coupled thereto. The method may include communicating power, signals, information, or other communication between the interior and exterior of the encapsulation, directly, indirectly, or otherwise, separately or in combination.

FIG. 1 is a block diagram that illustrates one of many embodiments of a valve status indicating system 100 utilizing certain aspects of the present invention. System 100 may include an encapsulation 102, such as a capsule, housing or other enclosure, and one or more encapsulated components, such as internal components 104, which may be wholly or partially disposed within encapsulation 102. System 100 may include an interconnect system, for example, one or more couplers 106, such as an electrical, mechanical, or other coupler, that allows communication between the interior 108 and exterior 110 of encapsulation 102. For example, coupler 106 may allow communication between internal components 104 and one or more external components 112 located outside of encapsulation 102.

Encapsulation 102 may include any type or shape of capsule or enclosure required by a particular application, and may preferably at least partially include a "zero volume" encapsulation. As used herein, "zero volume" means an encapsulation having little or no "empty" or void space therein. For example, a zero volume container may ideally have no, or substantially no, air space between the container and the contents inside the container, but in practice may include spaces therein, such as cavities or air bubbles, small enough so as to have an insignificant or otherwise acceptable effect on the desired operation or function of the container, as will be readily understood by one of ordinary skill in the art. Encapsulation 102 may be formed from any material and in any manner required by a particular application. For example, encapsulation 102 may be formed from a thermosetting bulk molding compound (BMC), resin, epoxy, silicone, filler, polymer, plastic, rubber, or other suitable encapsulant, separately or in combination. Encapsulation 102 may, but need not, have insulating properties, electrical, thermal, or otherwise, in whole or in part, as required by a particular application. The encapsulant may be injected, molded, or otherwise applied to one or more components of system 100, such as to internal components 104, in whole or in part, separately or in combination. A method of encapsulation may also provide protection from the effects of over-molding of the encapsulant.

System 100 may include one or more subsystems, which may include electrical, electronic, mechanical, or other subsystems, separately or in combination. One or more subsystems, such as a subsystem including internal components 104, may be embedded in encapsulation 102, in whole or in part. System 100 may include one or more subsystems disposed exterior of encapsulation 102, such as external components 112, which may include, for example, one or more systems for interaction with a human operator (HMIs). External components 112 may couple to or otherwise communicate with the embedded internal components 104, for example, through a communication system, which may, but need not, be an intrinsically safe interconnect system. Intrinsically safe systems may normally be used for connection between a field device in a hazardous area and, for example, a control system in a non-hazardous area, as required by a particular application. As another example, the present invention may include transmitting power, signals, information, or other data between the embedded interior systems and the exterior systems, directly or indirectly.

Referring further to the exemplary embodiment of FIG. 1, which is but one of many, system 100 may be adapted or otherwise configured to detect and indicate the status, such as the position, of a valve 114, for example, a linear, rotary or other type of valve, such as a fluid valve, for manipulating the passage of one or more substances, such as a gas or liquid, across some distance or point. In at least one embodiment of system 100, for example, system 100 may include a valve position sensor 116, which may, but need not, be a non-contact, or contactless, position sensor, such as for determining the position of an actuated valve. System 100 may include one or more status indicators, such as valve position indicator 118, for indicating one or more conditions of the system or one or more components thereof, such as a position of valve 114. Indicator 118 may be coupled, for example, to the exterior surface of encapsulation 102, but need not be, and may alternatively be coupled in any location required by a particular application, proximately, remotely, or otherwise. Indicator 118 may be any type of indicator required by a particular application, such as a visual, audible, or other indicator. In at least one embodiment, for example, indicator 118 may include one or more light emitting devices, such as a bulb or light emitting diode (LED), separately or in combination with other devices, for providing a user with visual indication or feedback of the status, such as the position, of the valve. As another example, indicator 118 may include a color-changing membrane or skin, which may, but need not, be electronic. Indicator 118 may be prompted, such as being signaled, to power on or off, change color or intensity, or otherwise indicate a valve status, such as a sensed valve characteristic or position. In at least one preferred embodiment, which is but one of many, one visual feedback device, such as an LED, can but need not be dependent on one or more other visual feedback devices.

With continuing reference to FIG. 1, system 100 may include one or more power sources, such as an AC or DC electrical power source. For example, system 100 may include a primary power source (not shown), which may, but need not, communicate with system 100 through coupler 106, and one or more secondary power sources, such as backup power source 120, for allowing the system to sense, monitor or display the status of valve 114, for example, even when primary power may not be available to the system. In at least one embodiment, system 100 may include a solar device (not shown), such as a solar power generating cell, for example, for providing power to the system. The power source(s) may be used for any function, such as, for example, for any auxiliary functions, operation of a pilot valve 128 or other functions. The system may further include a wireless communication protocol (not shown) for communicating with one or more other components of the system. The wireless communication protocol may allow wireless communication of information, such as information on the status of the valve, to be communicated with a control room, computer, receiver, transmitter or other component required by a particular application. The wireless protocol may, but need not, reduce the need for hard wiring for a particular application, in whole or in part, such as through coupler 106, which may improve the costs or other factors of the system. System 100 may include one or more sensors for sensing one or more conditions of the system. For example, in an embodiment having an air valve, which is but one of many, the system may include a pressure sensor 124 for sensing the air pressure supplied to the valve. As another example, the system may include a solenoid (not shown) having a coil and a sensor, which may include circuitry or other components, for sensing the current across the coil, for example. System 100 may include one or more processors 126, such as a microprocessor, for processing information, such as signals. Processor 126 may process the signals from, for example, one or more pressure sensors 124, current sensors or other sensors, or may communicate with one or more other components of the system, such as a pilot valve 128, or one or more BUS interfaces 130. System 100 may include one or more HMI's 132 for communicating with a user or one or more other components of the system. For example, a HMI 132 may display information to a user, such as status, position, or other information, and may allow user input into the system, such as operation information, control information, or other input.

In an embodiment having a solenoid, for example, the system may, but need not, require that both the solenoid power and the air supply pressure be available for normal operation. For instance, one or more indicators may indicate a "normal" status, such as by displaying a particular color, which may be any color, associated with a particular valve position when both signals are present. However, if one or the other signal is absent, the indicator color may change, such as to indicate one or more fault or other conditions. In such an embodiment, for example, the indicator may include a skin or membrane, such as one or more of those described above, and the membrane may, but need not, be sectioned so that different portions of the membrane may change color independently, such as to facilitate display of multiple status conditions. One of ordinary skill having the benefits of this disclosure will understand that the systems and methods described herein may allow the construction of valve position indicating devices that are relatively more compact, less expensive to produce, and able to withstand particular application environments, among having other advantages.

Figure 2:
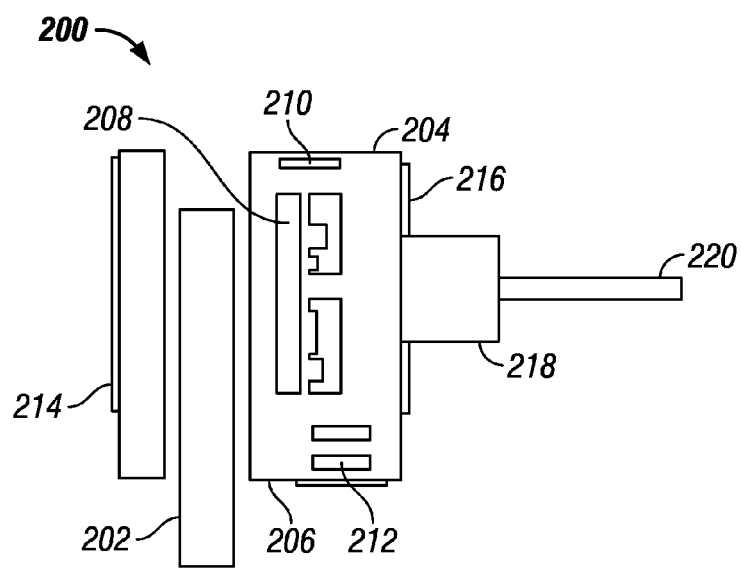
FIG. 2 is a schematic that illustrates another of many embodiments of a valve status indicating system utilizing certain aspects of the present invention.

FIG. 2 is a schematic that illustrates another of many embodiments of a valve status indicating system 200 utilizing certain aspects of the present invention. System 200 may, but need not, be the same as system 100 (described above) in one or more respects. Although different reference numerals may be used for convenience and clarity of purpose in some instances, the corresponding elements may be the same as, or different from, those in system 100 or one or more other embodiments of the present invention, as will be understood by one of ordinary skill in the art.

As shown in FIG. 2, for example, valve status indicating system 200 may be adapted to indicate one or more positions of a valve (not shown), such as, without limitation, a valve having a rotating actuator shaft 202. In such an embodiment, which is but one of many, system 200 may include an encapsulation 204, which may generally, but need not, have one or more characteristics of encapsulation 102 described above with reference to FIG. 1. For example, encapsulation 204 may be wholly or partially sealed from an environment surrounding the encapsulation, such as a hazardous environment, and may house or otherwise support one or more other components of the system. For instance, encapsulation 204 may enclose or protect one or more electrical or electronic components, in whole or in part, such as printed circuit boards (PCBs), switches, wiring, storage devices, processors, power sources, conduits, sensors, or any component known in the art that may merit protection from a surrounding environment in accordance with a particular application. In the embodiment of FIG. 2, for example, encapsulation 204 may house a valve position sensor 206 adapted to communicate with shaft 202 to sense the position of an associated valve. Sensor 206 may communicate with a processor 208, which may receive, relay or otherwise process signals or other information from sensor 206. Processor 208 may communicate with one of more other components of system 200, for example, one or more switches 210, such as a touch switch, power switch, or other switch known in the art. Encapsulation 204 may support one or more mechanical components, in whole or in part, such as a pilot valve 212, for controlling or otherwise operating a system as required by a particular application. System 200 may include an indicator 214 for indicating a status of a corresponding valve, which may include, for example, a light source, color changing skin, or other indicating structure, separately or in combination. Indicator 214 may, but need not, be protected or encased in encapsulation 204, in whole or in part.

Encapsulation 204 may be formed in any shape or manner required by a particular application, such as, for example, in one of the manners described elsewhere herein, separately or in combination. As shown in FIG. 2, for example, encapsulation 204 may, but need not, include an outer shell 216, such as a rigid, hard, tough, absorptive, or otherwise protective exterior covering or over-molding for protecting encapsulation 204 and one or more supported components from an environment surrounding all or part of system 200. As another example, encapsulation may, but need not, be a zero volume capsule, in whole or in part. System 200 may include a hub 218 or other interconnect system for allowing communication between the interior and exterior of encapsulation 204, which may, but need not, include a sealable port or hardware for access to or communication with one or more components of the system. For example, hub 218 may communicate with one or more conduits 220, which may include, without limitation, wires, cables, power supplies, fluid hoses, optical lines, antennas, or other components, including connectors or fasteners. Hub 218, or one or more other components of system 200, such as a covering, molding, or coupler, may, for example, be formed from potting material, in whole or in part. As will be understood by one of ordinary skill in the art, potting material may have many different forms or compositions, and may, without limitation, be used on electronic housings or other components to support mechanical strength, insulation, resistance to shock or vibration, or other desired characteristics required by a particular application.

With continuing reference to FIG. 2, one or more methods of the present invention will now be described. In the exemplary embodiment of FIG. 2, which is but one of many, a valve may be provided, which may, but need not, be a valve having a shaft 202. A valve status indicating system, such as one or more of the systems described above, in whole or in part, may be provided in communication with shaft 202, such as by disposing a position sensor 206, which can, but need not, be contactless, proximate to shaft 202. Shaft 202 may rotate or otherwise move positions during operation of the corresponding valve, and sensor 206, and/or one or more other sensors (not shown), may sense information such as the position or change in position of shaft 202. This information may be relayed to one or more other components of system 200, directly or indirectly, such as to processor 208 or indicator 214. Indicator 214 may indicate to a user, such as by changing color, intensity, or one or more other indications, the position, condition, change, or other status of the valve as required by a particular application. One or more portions or components of the indicating system may be encapsulated, in whole or in part, such as by encapsulation 204, as required by a particular application. Any encapsulant required by a particular application may be provided, and a capsule may be formed about the desired components or portions of components, separately or in combination, which may include providing or coupling an interconnect system for communication between components inside the capsule and components outside the capsule. The interconnect system may include, for example, direct couplers, such as, without limitation, hard wires or connectors for data, fluid or power, and/or, as another example, may include wireless communication components, such as antennas, wireless communication protocols, senders, receivers, or any other components required by a particular application. The capsule may, but need not, be formed in a zero volume, or substantially zero volume, fashion, in whole or in part.

Other and further embodiments utilizing one or more aspects of the invention described above can be devised without departing from the spirit of Applicants' invention. For example, the system may be any size required by a particular application and may be used with any type of valve. Further, the various methods and embodiments of the compact valve position indicator can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A system for indicating the status of a valve, comprising:
   an encapsulation with electronic circuitry disposed at least partially therein;
   a system for communication between an interior and exterior of the encapsulation;
   a valve position sensor embedded within the encapsulation;
   a valve position indicator comprising a color-changing membrane configured to change color independent of a bulb or light emitting diode or other light emitting device; and
   a microprocessor embedded within the encapsulation, the microprocessor monitoring the position sensor and controlling the position indicator.

2. The system of claim 1, wherein the encapsulation is a zero volume encapsulation.

3. The system of claim 1, further comprising, also embedded within the encapsulation, at least one of a backup power source, a wireless integration protocol, an air pressure supply sensor, and a solenoid coil current sensor.

4. The system of claim 1, wherein the membrane changes color in response to a fault condition of the valve.

5. The system of claim 1, wherein the membrane is adapted to indicate a plurality of status conditions.

6. The system of claim 1, wherein the valve position indicator includes a light emitting device.

7. The system of claim 1, wherein the valve position sensor is a contactless valve position sensor.

8. The system of claim 1, further comprising a backup power source and a pressure sensor embedded within the encapsulation.

9. A valve having a status indicating system, the status indicating system comprising:
   an encapsulation with electronic circuitry disposed at least partially therein;
   a system for communication between an interior and exterior of the encapsulation;
   a valve position sensor embedded within the encapsulation; and a valve position indicator, wherein the valve position indicator includes a color changing membrane configured to change color independent of a bulb or light emitting diode or other light emitting device; and a microprocessor monitoring the position sensor and controlling the position indicator.

10. The valve of claim 9, wherein the encapsulation is a zero volume encapsulation.

11. The valve of claim 9, further comprising, also embedded within the encapsulation, at least one of a backup power source, a wireless integration protocol, an air pressure supply sensor, and a solenoid coil current sensor.

12. The valve of claim 9, further comprising a backup power source and a pressure sensor embedded within the encapsulation.

13. A method of indicating a status of a valve, comprising:

providing a valve having one or more positions;

providing a status indicating system having an encapsulation with electronic circuitry disposed at least partially therein, a system for communication between an interior and exterior of the encapsulation, a valve position sensor embedded within the encapsulation, and a valve position indicator including a color changing membrane configured to change color independent of a bulb or light emitting diode or other light emitting device;

changing the position of the valve;

sensing the position of the valve; and indicating the position of the valve.

14. The method of claim 13, further comprising encapsulating at least a portion of the electronic circuitry with a zero volume encapsulation.

15. A method of encapsulating at least a portion of a valve status indicating system, comprising:

providing a valve status indicating system including a valve position sensor, a microprocessor monitoring the position sensor, and a valve position indicator, wherein the valve position indicator includes color changing membrane configured to change color independent of a bulb or light emitting diode or other light emitting device;

providing an encapsulant;

providing an interconnect system;

coupling the interconnect system to an electronic circuitry; and encapsulating the position sensor, the microprocessor, and at least a portion of the interconnect system with the encapsulant to form a capsule and so that the interconnect system allows communication between an interior and exterior of the capsule.

16. The method of claim 15, further comprising forming a zero volume capsule so that no substantial volume of air exists between the encapsulant and the electronic circuitry.

17. The method of claim 15, wherein the encapsulating step comprises encapsulating a backup power source and a pressure sensor within the encapsulant.

* * * * *